United States Patent
Jeon

(10) Patent No.: US 8,483,766 B2
(45) Date of Patent: *Jul. 9, 2013

(54) FOLDER TYPE MOBILE TELEPHONE AND OPERATING METHOD THEREOF

(75) Inventor: Byung-Su Jeon, Daegu (KR)

(73) Assignee: LG Electronics Inc., Seoul (KR)

( * ) Notice: Subject to any disclaimer, the term of this patent is extended or adjusted under 35 U.S.C. 154(b) by 826 days.

This patent is subject to a terminal disclaimer.

(21) Appl. No.: 12/030,488

(22) Filed: Feb. 13, 2008

(65) Prior Publication Data

US 2008/0139252 A1  Jun. 12, 2008

Related U.S. Application Data

(63) Continuation of application No. 10/173,865, filed on Jun. 19, 2002, now Pat. No. 7,400,902.

(30) Foreign Application Priority Data

Jun. 21, 2001 (KR) .................................. 2001-35334

(51) Int. Cl.
*H04M 1/00* (2006.01)
(52) U.S. Cl.
USPC ...................................... 455/566; 455/575.1
(58) Field of Classification Search
CPC ....................................................... H04M 1/00
USPC .................. 455/566, 575.1–575.9; 345/156, 345/659, 169
See application file for complete search history.

(56) References Cited

U.S. PATENT DOCUMENTS

| 5,414,444 A | 5/1995 | Britz |
| D398,305 S | 9/1998 | Kasbekar et al. |
| 5,918,188 A | 6/1999 | Doran |
| 6,085,112 A | 7/2000 | Kleinschmidt et al. |
| 6,104,916 A | 8/2000 | Steinhoff et al. |
| 6,125,286 A | 9/2000 | Jahagirdar et al. |

(Continued)

FOREIGN PATENT DOCUMENTS

| CN | 2381076 Y | 5/2000 |
| EP | 0 898 405 | 2/1999 |

(Continued)

OTHER PUBLICATIONS

Japanese Office Action dated May 22, 2009.

(Continued)

*Primary Examiner* — Lana N Le
(74) *Attorney, Agent, or Firm* — KED & Associates LLP

(57) ABSTRACT

A folder type mobile telephone and control method therefor are provided which utilize an auxiliary display unit viewable whether the folder is opened or closed. The folder type mobile telephone includes an auxiliary display unit and a main body having a main display unit. The folder type mobile telephone includes an opening at a position corresponding to the auxiliary display unit. The folder type mobile telephone may include a wheel button formed at one side of the main body to input user commands to the auxiliary display unit. A transparent window may be formed at the opening to protect the auxiliary display unit. Regardless of whether the folder is opened or closed, a user can view, and control the auxiliary display unit via wheel button inputs. Since the auxiliary display unit is formed on the main body, the relative thickness of the folder can be reduced to make the folder type mobile telephone compact.

11 Claims, 12 Drawing Sheets

U.S. PATENT DOCUMENTS

| | | | |
|---|---|---|---|
| 6,128,475 A * | 10/2000 | Wicks et al. | 455/575.4 |
| 6,141,540 A | 10/2000 | Richards et al. | |
| 6,230,028 B1 | 5/2001 | Shirakawa | |
| 6,266,538 B1 | 7/2001 | Waldron | |
| 6,275,714 B1 | 8/2001 | Kinz et al. | |
| 6,304,763 B1 | 10/2001 | Jahagirdar et al. | 455/566 |
| 6,396,924 B1 * | 5/2002 | Suso et al. | 379/433.13 |
| 6,411,826 B1 | 6/2002 | Camp, Jr. | |
| 6,484,041 B1 | 11/2002 | Aho et al. | 455/574 |
| 6,535,749 B1 * | 3/2003 | Iwata et al. | 455/556.2 |
| 6,549,789 B1 | 4/2003 | Kfoury | |
| 6,628,970 B2 | 9/2003 | Nishiyama et al. | |
| 6,667,731 B2 | 12/2003 | Park | 345/102 |
| 6,668,177 B2 | 12/2003 | Salmimaa et al. | 455/566 |
| 6,728,557 B1 | 4/2004 | Tracy et al. | |
| 6,785,562 B2 | 8/2004 | Lee et al. | |
| 6,788,551 B2 * | 9/2004 | Takagi | 361/814 |
| 6,791,773 B2 | 9/2004 | Nagaoka | |
| 6,856,695 B1 | 2/2005 | Nakamura et al. | |
| 6,871,083 B2 | 3/2005 | Kuroda | |
| 6,901,274 B2 * | 5/2005 | Idani et al. | 455/566 |
| 6,952,599 B2 | 10/2005 | Noda et al. | |
| 7,035,665 B2 | 4/2006 | Kido et al. | |
| 7,113,395 B2 | 9/2006 | Hara et al. | |
| 7,146,197 B2 | 12/2006 | Kang et al. | |
| 7,158,083 B2 | 1/2007 | Satoh et al. | 455/550.1 |
| 7,289,627 B2 | 10/2007 | Satoh et al. | 455/575.3 |
| 7,583,988 B2 * | 9/2009 | Jeon | 455/575.3 |
| 2001/0003707 A1 | 6/2001 | Moriya | |
| 2001/0006889 A1 | 7/2001 | Kraft | 455/412 |
| 2001/0006890 A1 | 7/2001 | Ryu | 455/414 |
| 2001/0011293 A1 * | 8/2001 | Murakami et al. | 709/201 |
| 2001/0023194 A1 | 9/2001 | Pettersson et al. | |
| 2001/0042095 A1 | 11/2001 | Kim et al. | 709/204 |
| 2001/0053708 A1 | 12/2001 | Sugiyama et al. | |
| 2002/0016191 A1 | 2/2002 | Ijas et al. | |
| 2002/0034063 A1 * | 3/2002 | Miller, Jr. | 361/680 |
| 2002/0063682 A1 * | 5/2002 | Yu | 345/169 |
| 2002/0080186 A1 * | 6/2002 | Frederiksen | 345/659 |
| 2002/0086702 A1 | 7/2002 | Lai et al. | |
| 2002/0102946 A1 * | 8/2002 | SanGiovanni | 455/575 |
| 2003/0119562 A1 | 6/2003 | Kokubo | |
| 2003/0224831 A1 | 12/2003 | Engstrom et al. | |
| 2004/0189861 A1 | 9/2004 | Tom | |
| 2004/0214610 A1 | 10/2004 | Tanemura et al. | |
| 2005/0140778 A1 | 6/2005 | Kim et al. | |
| 2007/0015551 A1 | 1/2007 | Iwama et al. | 455/575.3 |
| 2007/0142092 A1 | 6/2007 | Kim | 455/575.1 |

FOREIGN PATENT DOCUMENTS

| | | |
|---|---|---|
| EP | 0 961 461 | 12/1999 |
| EP | 1 044 957 | 5/2000 |
| EP | 1 033 644 | 9/2000 |
| FR | 2 790 894 | 9/2000 |
| JP | 11-074953 | 3/1999 |
| JP | 11-088483 | 3/1999 |
| JP | 11-120109 | 4/1999 |
| JP | 11-143891 | 5/1999 |
| JP | 11-249596 A | 9/1999 |
| JP | 11-249993 A | 9/1999 |
| JP | 11-317610 | 11/1999 |
| JP | 2001-112058 | 4/2001 |
| JP | 2002-261898 | 9/2002 |
| JP | 2002-354084 | 12/2002 |
| WO | WO 9819434 A1 * | 5/1998 |
| WO | WO 00/65800 | 11/2000 |

OTHER PUBLICATIONS

European Search Report dated Apr. 7, 2008.
Japanese Office Action dated Mar. 25, 2008.
European Office Action dated Jan. 27, 2010.
European Search Report dated Nov. 5, 2010 (Application No. 10175851.4-2221).
Japanese Office Action Dated Jan. 24, 2005.
Japanese Search Report dated Aug. 29, 2005.
European Search Report dated Apr. 26, 2007.
Japanese Notice of Allowance dated Jul. 3, 2009.

* cited by examiner

FOLDER TYPE MOBILE TELEPHONE AND OPERATING METHOD THEREOF

This application is a Continuation of U.S. patent application Ser. No. 10/173,865, filed Jun. 19, 2002, which claims priority under 35 U.S.C. §119 to Korean Application No. 2001-35334 filed Jun. 21, 2001 in Korea. The entire disclosure of the prior application is considered as being part of the disclosure of the accompanying application and is hereby incorporated by reference therein.

BACKGROUND

1. Field

The invention relates generally to a telephone, and more particularly, to a mobile telephone and a control method therefor.

2. Background of the Related Art

A mobile telephone may be classified into either a bar type mobile telephone where the keypad is exposed, a flip type mobile telephone where a cover is formed to protect the keypad, or a folder type mobile telephone where the main body and a cover body can be folded together. The folder type mobile telephone is especially popular. Because of its folding design, the folder type mobile telephone is compact and lightweight making it convenient to carry. However, in the conventional folder type mobile telephone, the display is located on the main body of the mobile telephone, or on the inner surface of the cover body or folder. Thus, once the folder type mobile telephone is folded or closed, the display is covered and hidden from view. Therefore, when the folder type mobile telephone is closed, the display is difficult to check, making it inconvenient to check, for example, the battery charge state, time of day or whether a message has been received.

In order to solve the problem of the hidden display of the folder type mobile telephone, a second or auxiliary display unit is placed on the outer surface of the cover body or folder such that it is visible when the mobile telephone is closed. With such an auxiliary display unit, displayed information can be viewed even when the folder type mobile telephone is closed.

As shown in FIGS. 1A and 1B, a conventional folder type mobile telephone includes a main body 10 and a folder 20 hinged at the main body 10. The folder 20 is rotatably mounted on a shaft in the hinge. The mobile telephone also includes an auxiliary display unit 21 located on an outer surface of the folder 20 and a main display unit 22 located on an inner surface of the folder 20. Also included in the mobile telephone is a keypad 11 consisting of number, power and function keys, and a microphone 12, all of which are formed on the inner surface of the main body 10 of the mobile telephone. During use, information entered through the keypad 11 may be displayed on the main display unit 22. A speaker 23 is also included in the mobile telephone and is located on the inner surface of the folder 20.

In operation of the conventional mobile telephone, when the folder 20 is opened and the mobile telephone is turned on, information such as remaining battery capacity and signal reception strength may be displayed on the main display 22. The time of any received calls, and whether a message has been left or received may also be displayed on the main display unit 22. Any characters or numbers entered through the keypad 11 are also displayed. In addition, information such as a date or time may be displayed. Thus, when the folder 20 is closed, power to the mobile telephone is turned off and no information is displayed on the main display unit 22, and when the folder 20 is opened, power is turned on and information is displayed on the main display unit 22 The mobile telephone can also be placed in standby mode where the folder is closed, but the mobile telephone is not turned off and can still receive calls.

To augment the inaccessible main display unit 22 when the folder type mobile telephone is in standby mode, information such as reception strength, messages received, remaining battery capacity, or time can be viewed on the auxiliary display unit 21 located on the outer surface of the folder 20. Since the auxiliary display unit 21 is on the outer surface of the folder 20, the conventional folder mobile telephone is more convenient to use because information otherwise only displayed on the main display unit 22 can be viewed even when the folder 20 is closed.

Due to the location of the main display unit 22 and the auxiliary display unit 21 of the conventional mobile telephone, only the main display unit 22 can be viewed when the holder 20 is open such as when transmitting a short message or accessing a wireless information network. Thus, in the conventional folder type mobile telephone, since the main display unit 22 and the auxiliary display unit 21 are fixed on opposite surfaces of the folder, the auxiliary display unit 21 and the main display unit 22 can not be used simultaneously. Such an arrangement of the displays causes an inefficient utilization of the mobile telephone components. Another problem with the conventional arrangement of the two displays in the conventional folder type mobile telephone is due to the main display unit 22 and the auxiliary display unit 21 being respectively attached to the inner surface and the outer surface of the folder 20. Accordingly, the folder 20 must be relatively thick making the mobile telephone less compact.

SUMMARY OF THE INVENTION

An object of the invention is to substantially solve one or more of the above problems and/or disadvantages in a whole or in part and to provide at least the advantages described hereinafter.

Another object of the invention is to provide a folder type mobile telephone or mobile telephone and a controlling method thereto that are capable of allowing a user to view an auxiliary display unit whether the mobile telephone's folder is opened or closed.

In order to achieve at least the above objects in whole or in part, and in accordance with the purposes of the invention as embodied and broadly described, there is provided a folder type mobile telephone including a main body having a display unit, and a folder rotatably or hingedly attached onto the main body having an opening or cut-out allowing the display unit on the main body, to be viewed when the folder is closed.

To further achieve at least the above objects in whole or in part, and in accordance with the purposes of the invention as embodied and broadly described, there is provided a folder type mobile telephone having an auxiliary or second display unit which is viewable whether the folder is opened or closed.

To further achieve at least the above objects in whole or in part, and in accordance with the purposes of the invention as embodied and broadly described, there is provided a folder type mobile telephone having a main body including an auxiliary display unit, and a folder including a main display unit and an opening or cut-out allowing the auxiliary display unit to be viewed when the folder is closed.

To further achieve at least the above objects in whole or in part, and in accordance with the purposes of the invention as embodied and broadly described, there is provided a folder type mobile telephone including a main body having an auxiliary display unit, a folder having a main display unit, and an opening or cut-out formed at a position corresponding to the auxiliary display unit when the folder is closed. The mobile telephone may also include a wheel button located at one side of the main body to enter commands or information to the auxiliary display unit.

To further achieve at least the above objects in whole or in part, and in accordance with the purposes of the invention as embodied and broadly described, a folder type mobile telephone is provided on which an auxiliary display unit is located at one side of the main body of the mobile telephone.

To further achieve at least the above objects in whole or in part, and in accordance with the purposes of the invention as embodied and broadly described, there is provided an operating method for a folder type mobile telephone including connecting to an information network through a folder type mobile telephone and displaying titles for information network pages found by searching the information network, and displaying messages or conversation content, for example, from email, bulletin boards, chat rooms, and other messaging systems.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A folder type mobile telephone in accordance with an embodiment of the invention includes an auxiliary display unit formed at a prescribed position on a main body of the mobile telephone. The mobile telephone may include an opening or cut-out formed on the folder in a position corresponding to the auxiliary display unit. The opening or cut-out is positioned so that the auxiliary display unit is visible when the folder of the mobile phone is either opened or closed.

Figure 1A:
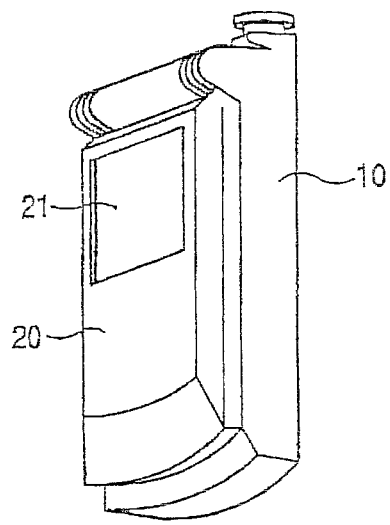
FIGS. 1A and 1B are drawings illustrating the structure of a conventional art folder type mobile telephone.
Figure 1B:
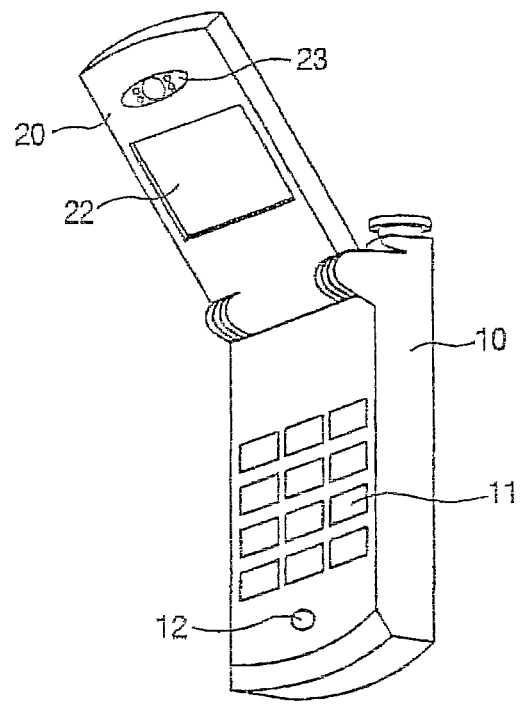
Figure 2A:
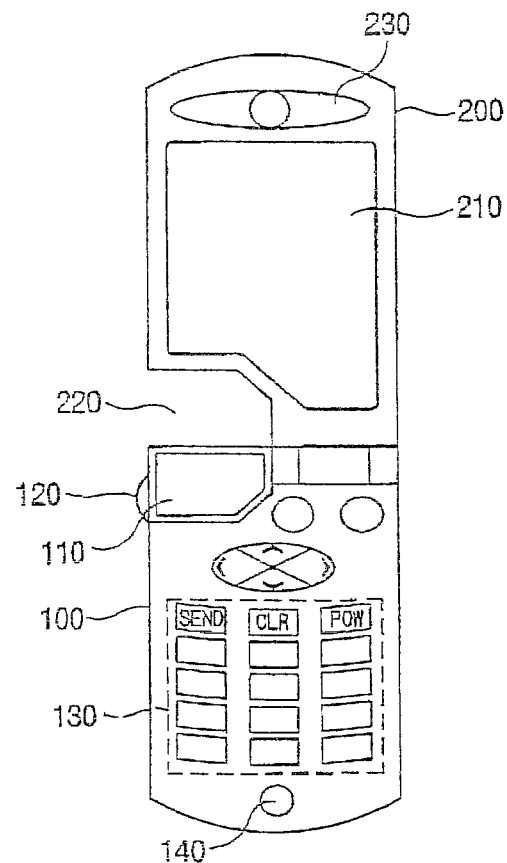
FIGS. 2A and 2B illustrate a folder type mobile telephone with an exposed auxiliary display unit in accordance with an embodiment of the invention.
Figure 2B:
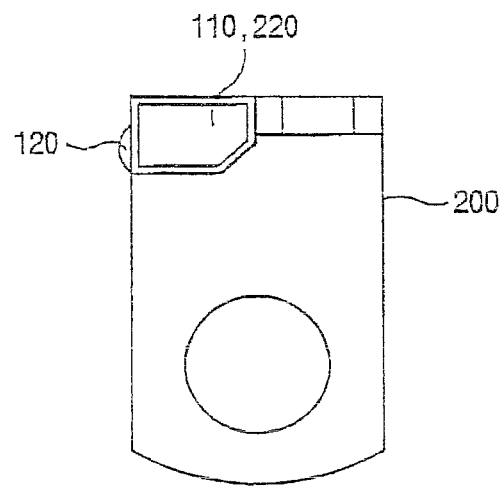

As shown in FIGS. 2 and 2B, a folder type mobile telephone in accordance with an embodiment of the present invention may include a main body 100 with an auxiliary display unit 110 located at an upper left corner of an inner surface of the main body. The mobile telephone may also include a folder 200 hinged at the main body 100 having an opening or cut-out 220 positioned to view the auxiliary display unit 110 regardless of whether the folder 200 is opened or closed. A main display unit 210 located at an inner surface of the folder 200 may also be included in the mobile telephone. A wheel button 120 may be additionally included on either the left side or right side of the main body 100. The wheel button 120 may be configured to enter commands or information to the auxiliary display unit 110.

A keypad 130 including, for example, number keys, power keys and function keys may be included on a lower side of the auxiliary display unit 110 on the inner surface of the main body 100. A microphone 140 may be placed near the bottom of the main body 100. The folder 200 also may include a speaker 230 and a main display unit 210 for displaying information.

The auxiliary display unit 110 makes the mobile telephone more convenient to use by displaying information such as reception strength, remaining battery capacity, whether a message has been received and the time when the message was received, when the mobile telephone is in a standby mode or the folder 200 is otherwise closed. The auxiliary display unit 110 may also augment the main display unit 210 when the mobile telephone is in use.

Figure 3A:
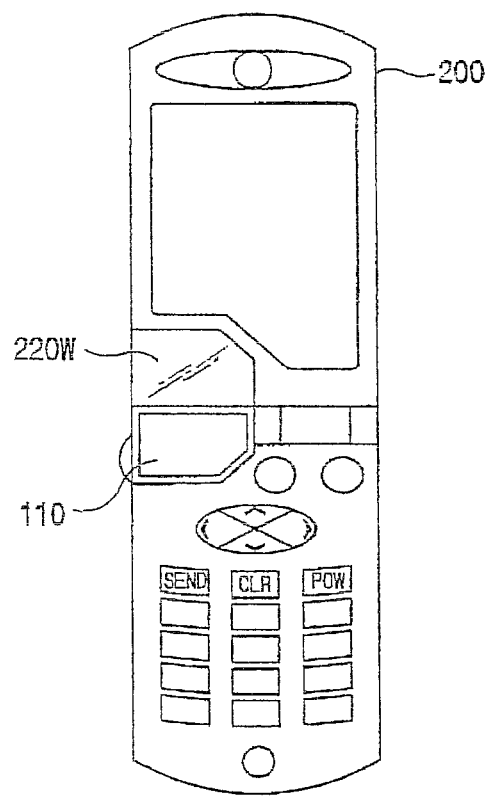
FIGS. 3A and 3B illustrate a folder type mobile telephone with a protected auxiliary display unit in accordance with an embodiment of the invention.
Figure 3B:
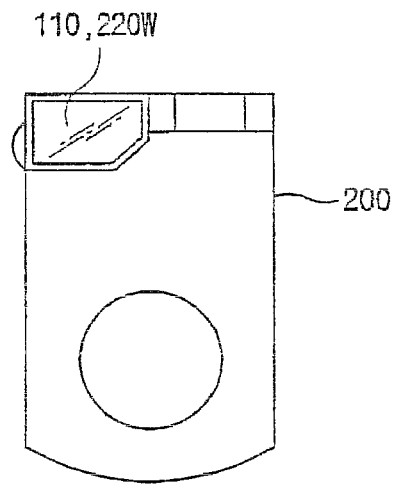

FIGS. 3A and 3B illustrate an embodiment of the invention where a transparent window 220W is formed in or over the opening 220 of the folder 200. The transparent window 220W protects the auxiliary display unit 110, while allowing a user to view the auxiliary display unit 110 when the folder 200 is closed.

Figure 4A:
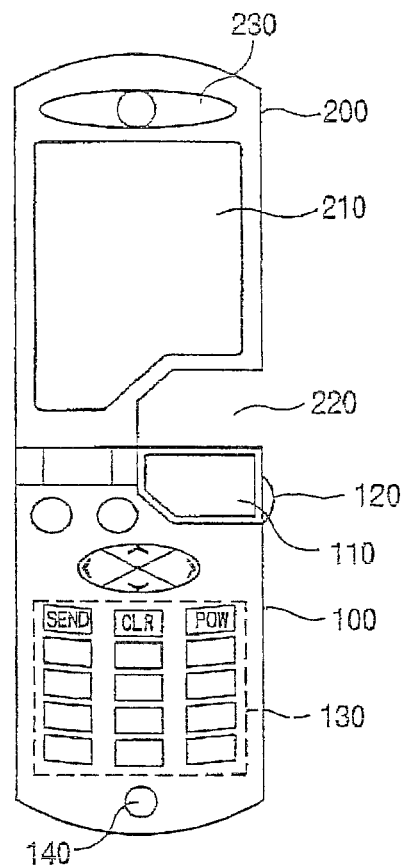
FIGS. 4A and 4B illustrate a folder type mobile telephone with an exposed auxiliary display unit in accordance with an embodiment of the invention.
Figure 4B:
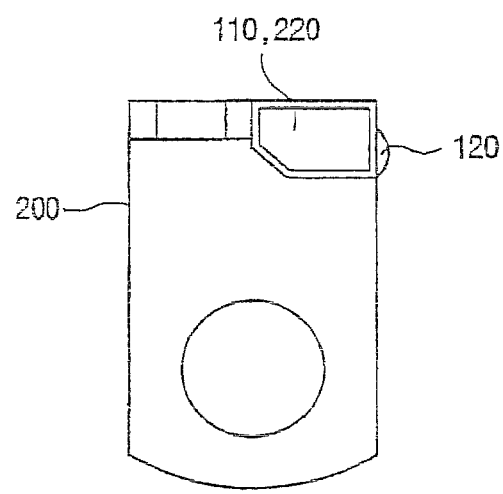

As shown in FIGS. 4A and 4B, a folder type mobile telephone in accordance with an embodiment of the invention includes a main body 100 and an auxiliary display unit 110 located at a right upper end of the inner surface of the main body 100. The mobile telephone also includes a folder 200 hinged at the main body 100 having an opening or cut-out 220 allowing the auxiliary display unit 110 to be viewed regardless of whether the folder 200 is opened or closed. A main display unit 210 formed at an inner surface of the folder 200 may also be included on the mobile telephone.

The mobile telephone may also include a wheel button 120 for controlling the auxiliary display unit 110, and a transparent window 220W attached on or within the opening 220 to protect the auxiliary display unit 110, while allowing a user to view the auxiliary display unit 110 regardless of whether the folder 200 is opened or closed.

Figure 5A:
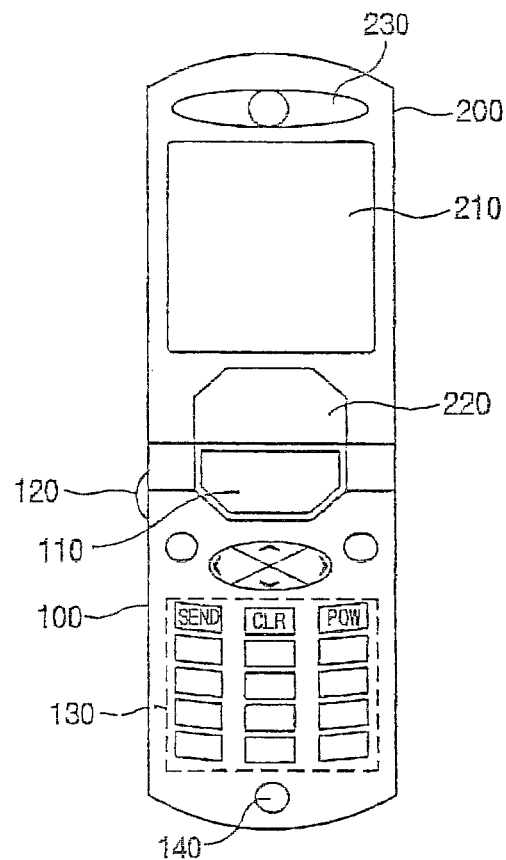
FIGS. 5A and 5B illustrate a folder type mobile telephone with an exposed auxiliary display unit in accordance with an embodiment of the invention.
Figure 5B:
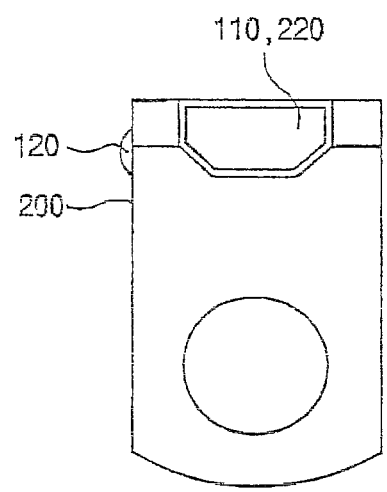

As shown in FIGS. 5A and 5B, a folder type mobile telephone in accordance with an embodiment of the invention may include a main body 100 and an auxiliary display unit 110 located in the middle of the upper end of the inner surface of the main body 100. The mobile telephone also includes a folder 200 hinged at the main body 100 having an opening 220 to view the auxiliary display unit 110 regardless of whether the folder 200 is opened or closed. A main display unit 210 located at an inner surface of the folder 200 may also be included in the mobile telephone. A wheel button 120 may be provided on the main body 100 to assist in controlling the auxiliary display unit 110.

Figure 6A:
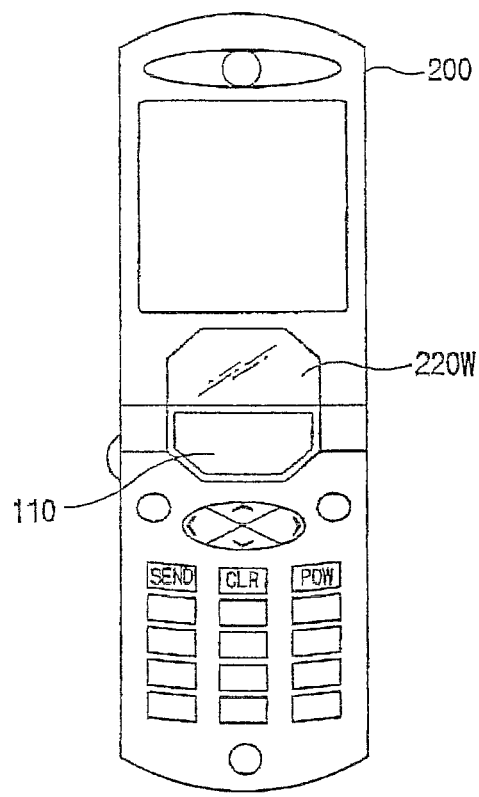
FIGS. 6A and 6B illustrate a folder type mobile telephone with a protected auxiliary display unit in accordance with an embodiment of the invention.
Figure 6B:
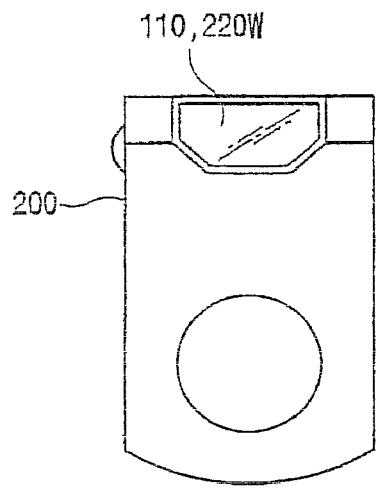

FIGS. 6A and 6B illustrate a transparent window 220W located on or within the opening 220 of the folder 200 to protect the auxiliary display unit 110 when the folder is closed.

Figure 7:
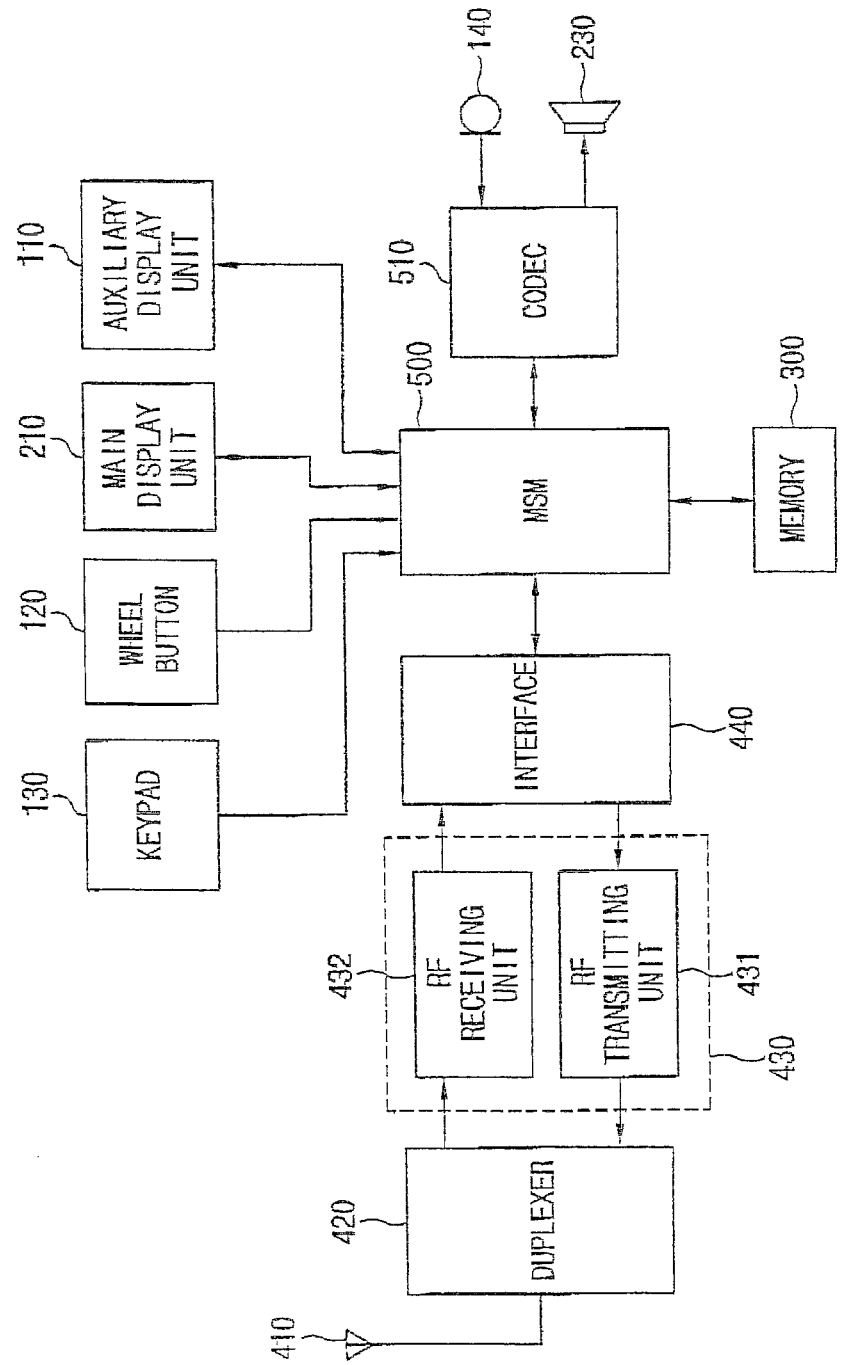
FIG. 7 is a block diagram of a folder type mobile telephone in accordance with an embodiment of the invention.

As shown in FIG. 7, an embodiment of the folder type mobile telephone in accordance with the invention may include a mobile station modem 500 (MSM) for controlling the mobile telephone and for enabling telephone calls and information network communications. The mobile telephone also includes a duplexer 420 for separating signal transmissions to and from a base station through an antenna 410. A transmitting and receiving unit 430 is coupled to the duplexer 420 for transmitting an internal signal of the mobile telephone as a radio frequency signal and receiving signals through the antenna 410. Also included in the mobile telephone is a keypad 130 for entering information and commands to the mobile station modem 500.

A main display unit 210 is provided on the mobile telephone for displaying, for example, mobile telephone status and other information to the user according to control and information inputs. An auxiliary display unit 110 on an inner surface of the main body is also provided to augment the unit display unit 210, as well as to allow the user to view mobile telephone information when the folder is either opened or closed. A CODEC 510 provided for coding a voice signal received from a microphone 140, and for decoding an output signal of the MSM 500 and outputting the decoded signal to the speaker 230, is coupled to the MSM 500. A wheel button 120 is also included to enter user commands and information to the auxiliary display unit 110.

The transmitting and receiving unit 430 of the mobile telephone includes an RF transmitting unit 431 for modulating a signal received from the MSM 500 and through an interface 440 into an RF signal, and for outputting the modulated signal through the duplexer 420, to be transmitted by the antenna 410. An RF receiving unit 432 is provided for demodulating an RF signal received through the antenna 410 and the duplexer 420. The RF receiving unit outputs the demodulated signal to the MSM 500 through the interface 440.

The main display unit 210 is augmented by the auxiliary display unit 110. Accordingly, when the folder is opened and a text message is displayed on the main display unit 210 or another operation is being performed by the main display unit 210, the auxiliary display unit 110 can display, for example, time as well as other information. The auxiliary display unit 110 can also display, for example, information network page search history for pages opened using a wireless information network so that the user can directly move to a desired information network page on the main display unit 110. When the auxiliary display unit 110 is used to display messages, such as chat message content, when the user is chatting on a information network, and a previously inputted word or sequence of words is to be repeated, the corresponding words can be selected from among the displayed words and inputted in order to make such conversation mote efficient. During such an input operation, the wheel button 120 can be rotated to scroll through characters, words of information network pages or chat message content without multiple time consuming keypad inputs.

Figure 8:
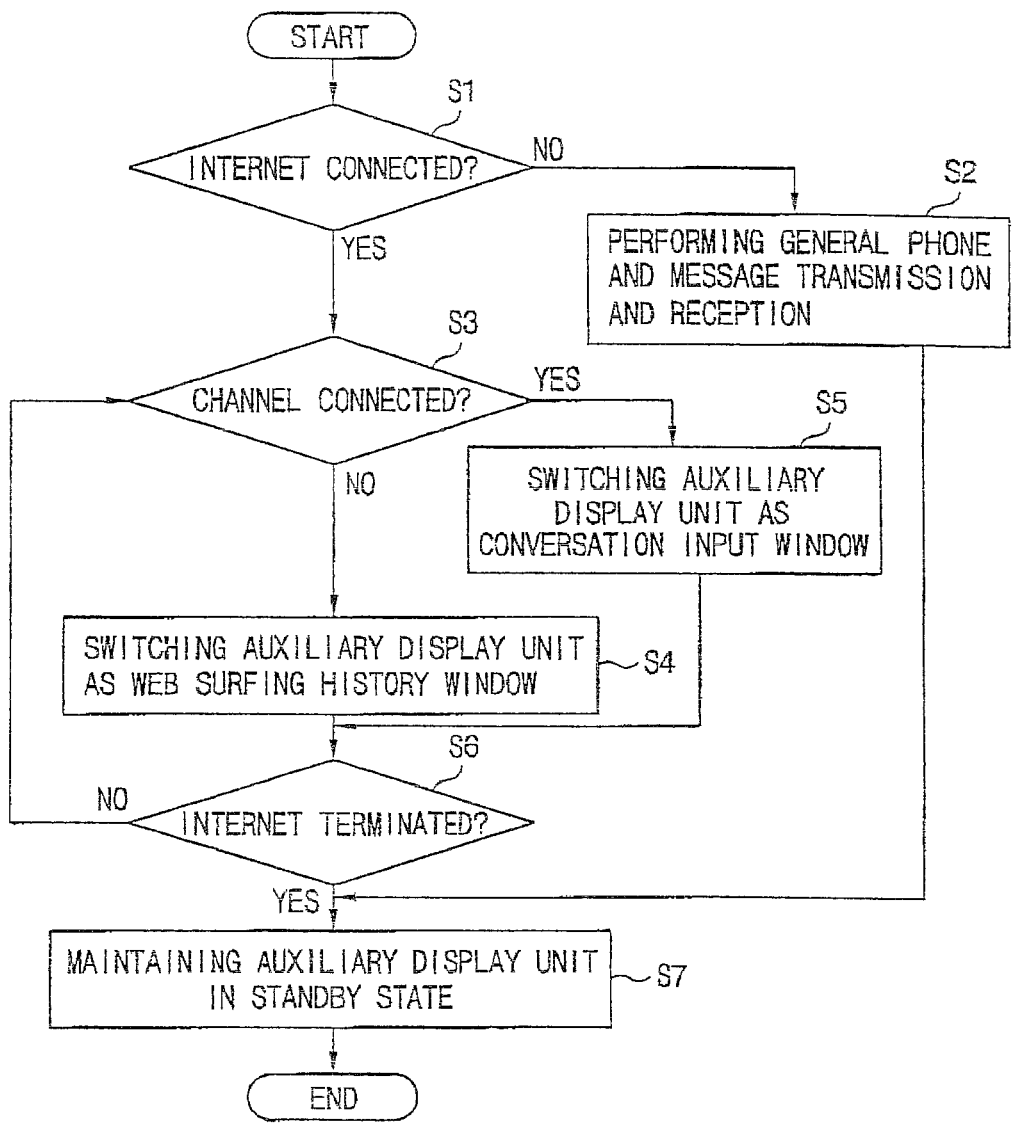
FIG. 8 is a flow chart of an operating method of a folder type mobile telephone in accordance with an embodiment of the invention.

An operation method of the folder type mobile telephone according to an embodiment of the invention is shown in FIG. 8. In step S1, when the folder of the folder type mobile telephone is opened, and the mobile telephone is in standby mode to receive signals, the mobile telephone determines whether a user is connected to the internet as the information network. In step S2, if the mobile telephone determines the user is not connected to a wireless information network, the mobile telephone performs, for example, standard mobile telephone, pager, or other messaging system functions in accordance with instructions inputted from the user.

In step S3, if the mobile telephone determines that the user is connected to a wireless information network, the mobile telephone checks whether the user has entered commands to enable chatting on the information network through the mobile telephone. In step S4, if the user has not entered commands to enable chatting on the information network, the auxiliary display unit 110 of the mobile telephone is switched to function as an information network search history window to allow the user to view search results while searching the information network. In step S5, if the user has selected the internet chat mode, the auxiliary display unit 110 is configured to function as a conversation input window.

In step S6, when the user terminates a chat session or information network search session, the mobile telephone checks whether the user has entered commands to terminate the mobile telephone's connection to the information network. Further in step S6, at the end of a chat session or an internet search, if the user does not terminate the information network connection, the mobile telephone performs the step of checking whether the user has entered commands to search the information network.

In step S7, at the end of a chat session or an network search, if the user selects to terminate the connection to the information network, the auxiliary display unit 110 is switched to a standby mode. In the standby mode, the auxiliary display unit 110 may be configured for displaying messaging or calling information, type of display node, remaining battery capacity, current time etc., as well as information relating to the initiation of such operations.

Figure 9:
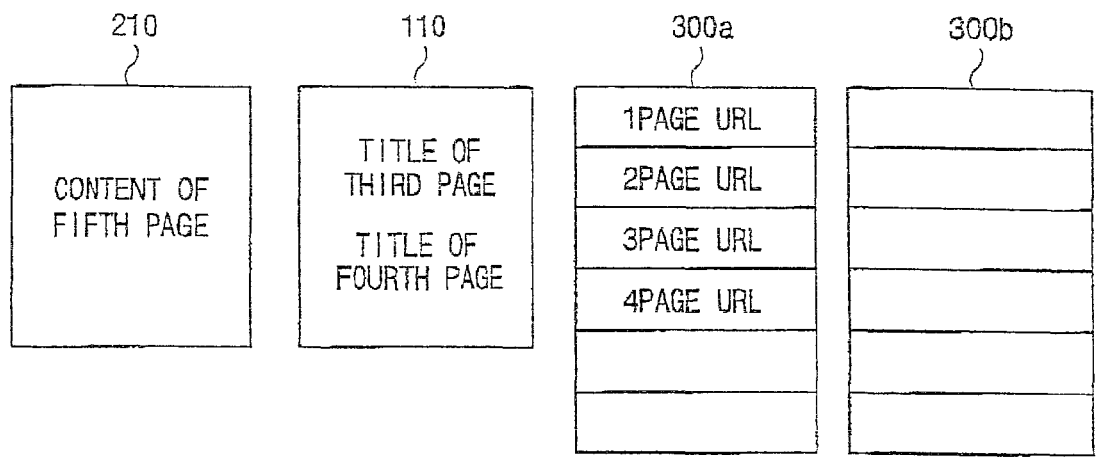
FIGS. 9, 10 and 11 illustrate steps of an information network searching method using a folder type mobile telephone in accordance with an embodiment of the invention.
Figure 10:
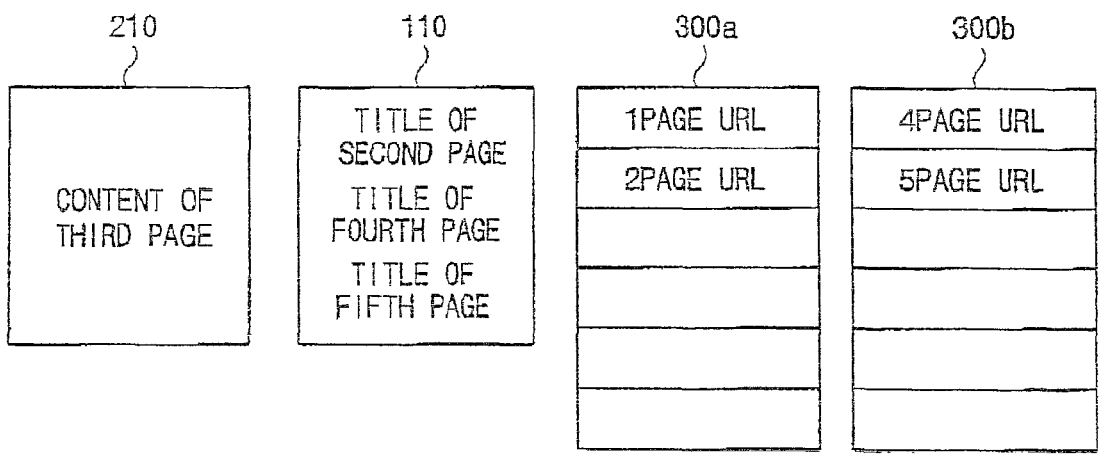
Figure 11:
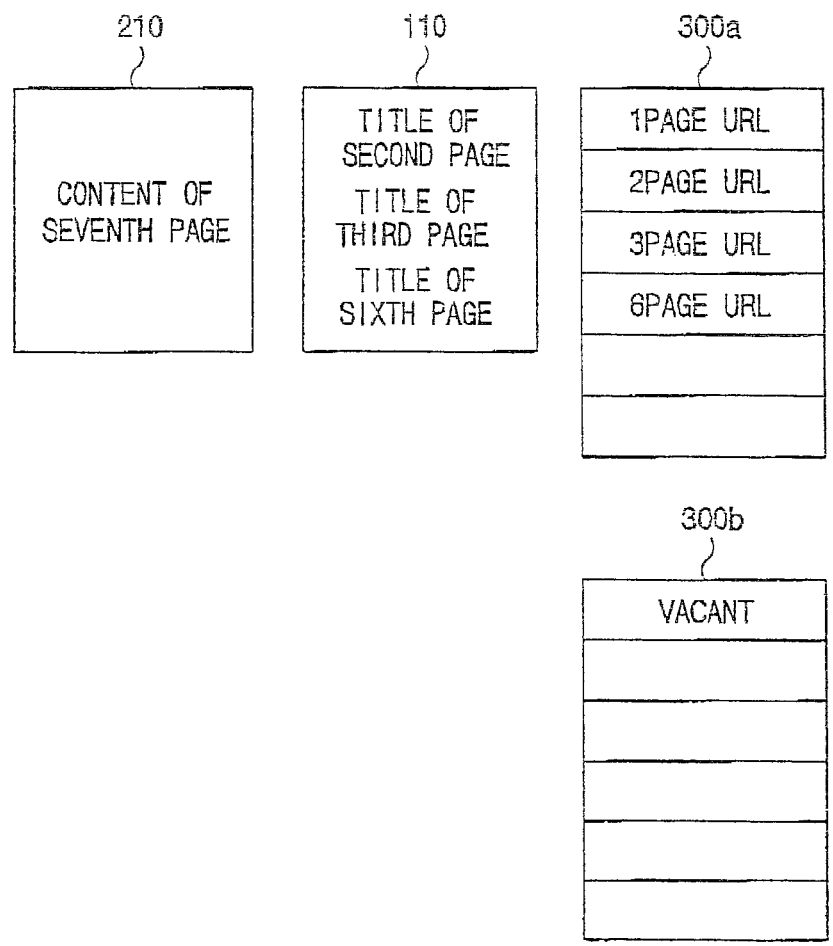

FIGS. 9, 10 and 11 show an information network searching method for a folder type mobile telephone in accordance with an embodiment of the invention in which the auxiliary display unit 110 displays search history when searching an information network. As in other embodiments, the folder type mobile telephone includes a main display unit 210 for displaying a current information network page, and an auxiliary display unit 110 for displaying titles of pages previously searched by the user. The mobile telephone may also include a first history database 300a and a second history database 300b for storing information network addresses, such as URLs from the internet, corresponding to pages associated with titles displayed on the auxiliary display unit 110. These history databases 300a and 300b maybe included in a memory 300.

Addresses of each information network page accessed by the user through the information network maybe sequentially stored in the first history database 300a. Another lower level set of addresses of the information network pages, accessed when a back command is executed, may be stored in the second history database 300b.

FIG. 9 illustrates how a user may sequentially search a first, second, third, fourth, and fifth information network page through keypad inputs while simultaneously displaying the contents of a particular page on a display. For example, the content corresponding to the fifth information network page may be displayed on the current main display unit 210, while the titles of first, second, third and fourth information network pages are sequentially displayed on the auxiliary display unit 110. To conserve memory 300, the MSM 500 sequentially stores the addresses of the first, second, third and fourth information network page in the first history database 300*a*, but does not store any addresses of the searched information network pages in the second history database 300*b*.

FIGS. 10 and 11 illustrate a method of using the auxiliary display unit 110 of the folder type mobile telephone in accordance with an embodiment of the invention. In particular, as shown in FIG. 10, when a user selects an address of, for example, a third information network page, the address of the third information network page from among the history list is displayed on the auxiliary display unit 110 by wheel button inputs. When such a selection is made, the mobile station modem 500, which has received the output signal of the wheel button, displays the third information network page on the main display unit 210. Additionally, the MSM 500 sequentially displays the titles of the first, second, four, and fifth information network pages on the auxiliary display unit 110. The MSM 500 also sequentially stores the addresses of the first and second information network pages in the first history database 300*a* of the memory 300. The addresses of the fourth, and fifth information network pages in the second history database 300*b* of the memory 300 are also sequentially stored by the MSM 500.

FIG. 11 illustrates a method of searching an information network in accordance with an embodiment of the invention in which the user searches a new information network page trough the keypad 130. As shown in FIG. 11, when the user doing such a search sequentially searches new sixth and seventh information network pages by keypad inputs, the seventh information network page is displayed on the main display unit 210. Additionally, titles of the first, second, third and sixth information network pages are displayed on the auxiliary display unit 110. Thus, when the user is connected to the new information network page, the content of the second history database 300*b* is deleted and the content of the connected information network page is stored in the first history database 300*a*.

Accordingly, when the user's connection is changed from the third information network page to the sixth and seventh information network pages, the addresses of the first, second, third and sixth information network pages are stored in the first history database 300*a*, and the addresses of the fourth and fifth information network pages stored in the second history database 300*b* are deleted. Furthermore, when the user is again connected to the third information network page, the address of the sixth information network page is stored in the second history database 300*b*, and addresses of the first and second information network pages remain in the first history database 300*a*.

Figure 12:
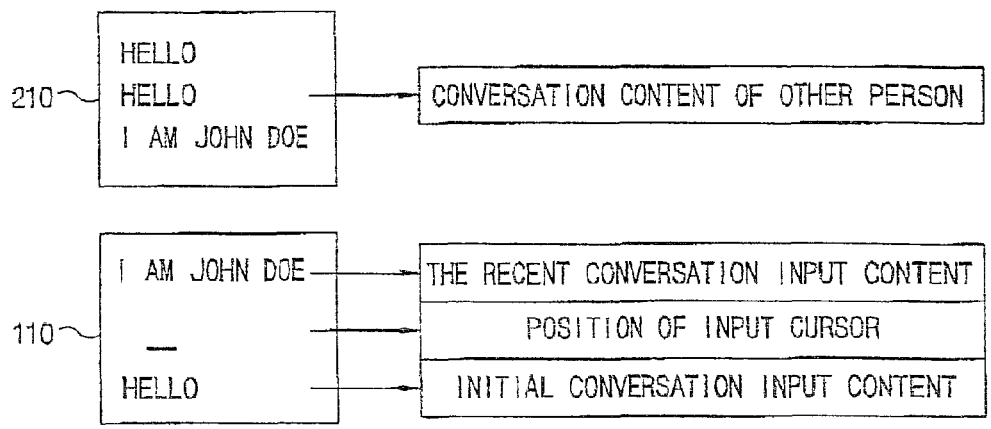
FIGS. 12, 13 and 14 illustrates steps of a chatting method using a folder type mobile telephone in accordance with an embodiment of the invention.
Figure 13:
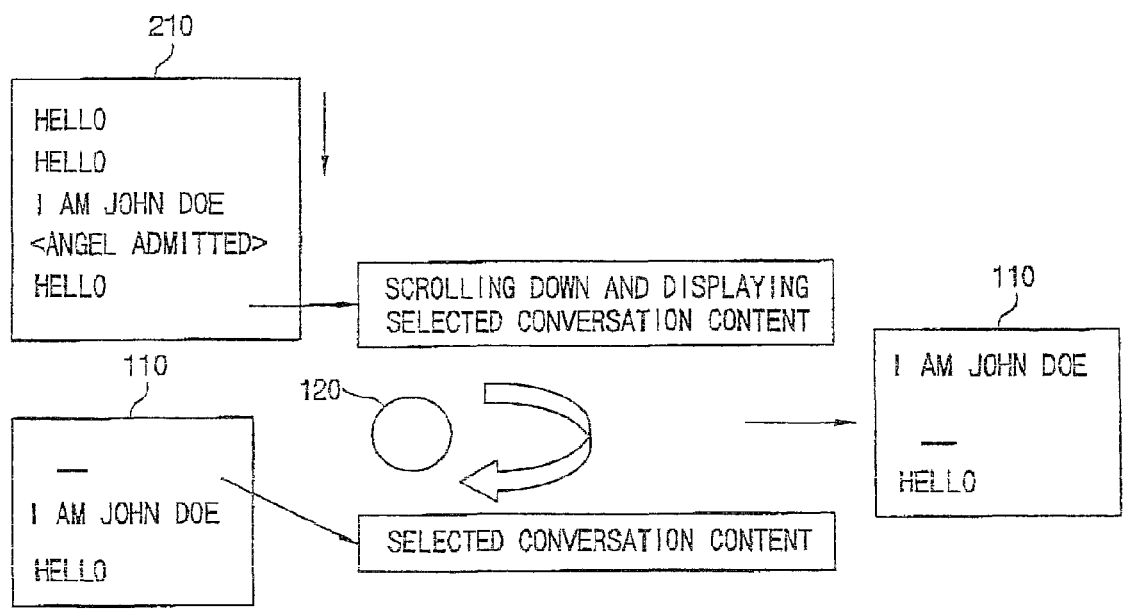
Figure 14:
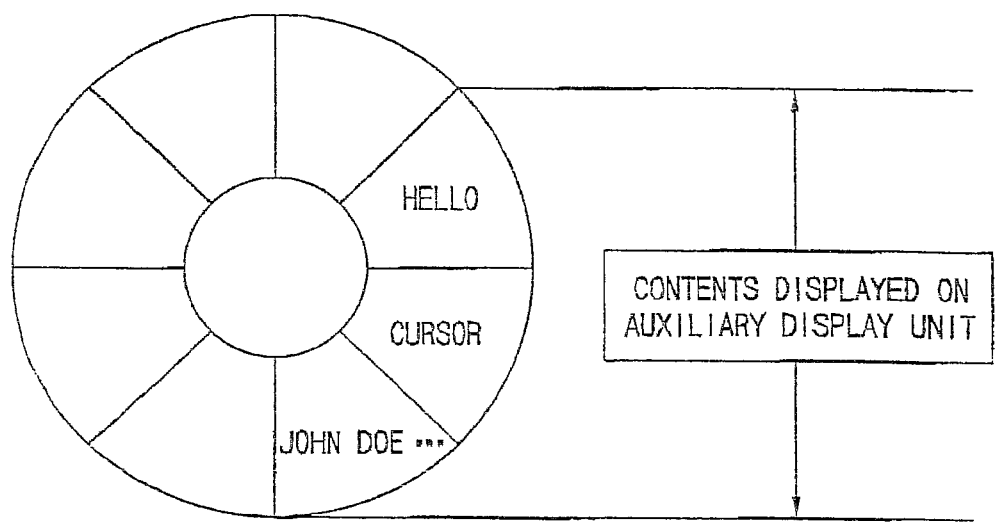

FIGS. 12, 13 and 14 illustrate an information network chatting method using a folder type mobile telephone in accordance with an embodiment of the invention. In particular, FIG. 12 illustrates an embodiment in accordance with the invention in which the auxiliary display unit 110 is used as a conversation input window during information network chatting. The folder type mobile telephone includes a main display unit 210 for displaying conversation content during the information network chat.

An auxiliary display unit 110 for displaying a conversation which has been inputted in the main display unit 210 is also included in the folder type mobile telephone. At the upper end of the auxiliary display unit 110, the most recently inputted conversation content is displayed. That is, in the auxiliary display unit 110, the recent conversation input content is displayed at the upper end of an input cursor, and a prior conversation content is displayed at a lower end of the input cursor. In such a configuration, the user selects the conversation content displayed on the auxiliary display unit 110 and inputs it into the main display unit 210. The conversation input content, up to the allocated memory size, is then stored in the memory 300 during network chatting.

Referring to FIG. 13, an embodiment in which the auxiliary display unit 110 is utilized through the wheel button 120 is shown in accordance with the invention. When the user actuates the wheel button 120, the user moves the cursor of the auxiliary display unit 110 by scrolling the wheel button 120 up and down. In response to scrolling the wheel button 120, the conversation contents which have been inputted into the main display unit 210 through the keypad and stored in the memory are displayed in input order. During such scrolling, the more recently inputted conversation content is displayed at the upper end of the auxiliary display unit 110, and the prior inputted conversation content is displayed at the lower end of the auxiliary display unit 110. Thus, when the user scrolls the wheel button 120 up, the cursor is moved towards the more recent conversation content. When the user scrolls the wheel button 120 down, the cursor is moved towards the older inputted conversation content.

The conversation content at which the cursor is positioned may be entered into the main display unit 210 according to selection by the user. For example, after a first user inputs a conversation "Hello" and "I am John Doe" through the keypad, and a new person begins to participate in the chat, the first user selects the message "Hello" displayed on the auxiliary display unit 110 with the wheel button 120 to input it into the main display unit 210. Thus, instead of inputting a new "Hello" message through the keypad, the first user can designate a "Hello" message displayed on the auxiliary display unit 110 from the previously inputted messages and input it on the main display unit 210 as a response.

FIG. 14 illustrates an embodiment of the wheel button in accordance with the invention. In operation, whenever the wheel button is scrolled through a step, the cursor is moved up or down a line. Accordingly, by scrolling the wheel button, the messages displayed on the auxiliary display unit 110 and the cursor are scrolled up and down, line by line, in response to the scroll inputs.

The folder type mobile telephone according to the invention has many advantages. For example, the folder type mobile telephone is configured so that the user can view the auxiliary display screen regardless of whether the mobile telephone folder is opened or closed. Thus, accessibility and usefulness of the auxiliary display unit 110 is increased. Another advantage is that because the utilization of the auxiliary display unit is improved by installing the wheel button, when a user chats over an information network, keyboard use is reduced by reusing previously inputted messages via wheel button inputs. Another advantage is that searches on an information network are more convenient because a previously searched information network page can be easily searched again via wheel button inputs. Finally, since the auxiliary display unit 110 is attached to the main body of the mobile telephone, the relative thickness of the folder can be reduced, so that the overall size of the mobile telephone is reduced.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modification, and variations will be apparent to those skilled in the art. In the claims, means-plus-function clauses are intended to cover the structures described herein as performing the recited function and not only structural equivalents but also equivalent structures.

What is claimed is:

1. A mobile phone, comprising:
a main body having a length and a width;
a radio frequency transceiver in the main body configured to establish wireless communication with a network;
a foldable portion movable between a closed position and an open position relative to the main body;
a hinge that operatively connects the foldable portion to the main body;
at least one display configured to display at least one of contents and a list of previously displayed contents;
a rotatable button operatively connected to the main body to receive inputs from a user to allow at least one of scrolling through the list and selection of one or more items in the list;
a keypad configured to receive inputs from the user to allow user interaction with the at least one display, wherein a first portion of the at least one display is located laterally adjacent the hinge with respect to a central longitudinal axis of the mobile phone and a second portion is located on the foldable portion, and wherein the second portion displays current contents and the first portion displays the list of the previously displayed contents; and
a memory having a first database and a second database configured to store information related to a web page address of the previously displayed contents, wherein the information of the contents accessed through the network is stored in the first database and the information of the contents accessed when a back command is executed is stored in the second database, and wherein the information stored in the second database is deleted when a new contents is accessed through the network.

2. The mobile phone of claim 1, wherein the contents are displayed on the at least one display in a sequential manner.

3. The mobile phone of claim 2, wherein the contents displayed on the at least one display are viewable using at least one of a back key function and a forward key function.

4. The mobile phone of claim 1, wherein the contents are web pages.

5. The mobile phone of claim 1, wherein the stored information includes a network address of the web page.

6. The mobile phone of claim 1, wherein the rotatable button is a wheel button.

7. The mobile phone of claim 6, wherein the wheel button is located on a side of the main body.

8. The mobile phone of claim 1, wherein the keypad is located on the main body.

9. The mobile phone of claim 1, wherein the keypad is exposed when the foldable portion is in the open position.

10. The mobile phone of claim 1, wherein the list comprises a title for each of the previously displayed contents.

11. The mobile phone of claim 1, wherein the second portion comprises a main display and the first portion comprises an auxiliary display.

* * * * *